(12) United States Patent
Phan et al.

(10) Patent No.: US 10,464,217 B1
(45) Date of Patent: Nov. 5, 2019

(54) ROBOTIC GRIPPER WITH DRIVEN BELTS

(71) Applicant: Traptic, Inc., Mountain View, CA (US)

(72) Inventors: Paul Vinh Phan, Sunnyvale, CA (US);
Bryan Ritoper, Sunnyvale, CA (US);
Lewis Anderson, Mountain View, CA (US)

(73) Assignee: Traptic, Inc., Mountain View, CA (US)

( * ) Notice: Subject to any disclaimer, the term of this patent is extended or adjusted under 35 U.S.C. 154(b) by 120 days.

(21) Appl. No.: 15/721,369

(22) Filed: Sep. 29, 2017

(51) Int. Cl.
| | |
|---|---|
| *B25J 15/00* | (2006.01) |
| *B25J 9/00* | (2006.01) |
| *A01D 46/30* | (2006.01) |
| *B25J 15/10* | (2006.01) |
| *B25J 13/08* | (2006.01) |
| *B25J 5/00* | (2006.01) |
| *B25J 19/02* | (2006.01) |
| *B25J 9/10* | (2006.01) |

(52) U.S. Cl.
CPC ............ *B25J 15/10* (2013.01); *A01D 46/30* (2013.01); *B25J 5/007* (2013.01); *B25J 9/10* (2013.01); *B25J 13/088* (2013.01); *B25J 19/02* (2013.01)

(58) Field of Classification Search
CPC ...... A01D 45/006; A01D 46/24; A01D 46/30; A01D 46/005; B25J 5/007; B25J 15/10; B25J 15/0206; B25J 15/12; B25J 15/0009; B25J 19/021; B25J 19/023; B25J 9/1679; B25J 9/08; B25J 9/18; B25J 9/104; B25J 9/1664; B25J 9/1612; B25J 9/1075; B25J 13/088; B25J 9/10; B25J 19/20

USPC .... 56/327.1, 328.1, 332, 336, 329, 335, 338
See application file for complete search history.

(56) References Cited

U.S. PATENT DOCUMENTS

| | | | | | |
|---|---|---|---|---|---|
| 3,485,026 | A | * | 12/1969 | Davis | A01D 46/20 56/328.1 |
| 3,591,949 | A | * | 7/1971 | Connery | A01D 46/005 56/332 |
| 4,663,925 | A | * | 5/1987 | Terada | A01D 46/24 382/153 |
| 4,986,723 | A | * | 1/1991 | Maeda | B25J 9/06 294/111 |
| 5,426,927 | A | * | 6/1995 | Wang | A01D 46/24 56/328.1 |
| 6,896,704 | B1 | * | 5/2005 | Higuchi | A61F 2/583 623/25 |
| 7,810,305 | B2 | | 10/2010 | Macidull | |
| 8,260,458 | B2 | * | 9/2012 | Kim | B25J 9/1612 294/213 |
| 8,306,663 | B2 | * | 11/2012 | Wickham | B25J 9/1679 700/259 |
| 9,120,233 | B2 | * | 9/2015 | Moore | B25J 13/08 |

(Continued)

FOREIGN PATENT DOCUMENTS

| | | |
|---|---|---|
| CN | 103299776 | 9/2013 |
| WO | WO 2008/037035 | 4/2008 |

*Primary Examiner* — Robert E Pezzuto
(74) *Attorney, Agent, or Firm* — Haynes and Boone, LLP

(57) ABSTRACT

An apparatus including a base, a plurality of fingers coupled to the base and arranged to define a containment area, where each finger includes a mechanical assembly defining a belt path, a belt positioned within the belt path, and a drive motor configured to operate the belt, and a controller configured to operate the drive motors to move the belts in a retract direction to move an external object into the containment area is provided. Related methods and systems are also provided.

20 Claims, 13 Drawing Sheets

(56) References Cited

U.S. PATENT DOCUMENTS 9,554,512 B2 * 1/2017 Davidson ............... A01D 46/30
2009/0302626 A1 * 12/2009 Dollar ..................... B25J 9/104
                                                      294/106

* cited by examiner

ROBOTIC GRIPPER WITH DRIVEN BELTS

TECHNICAL FIELD

One or more embodiments of the invention relate generally to robotic systems and, more particularly, to robotic grippers for holding and manipulating objects.

BACKGROUND

Currently, fruits, vegetables, and other types of produce are generally picked by hand through manual labor. Picking produce by hand is labor intensive, slow, and manpower is expensive. Additionally, manual labor may result in error when picking (e.g., missing items, picking produce that is not ripened, and damaging produce when picked) and the intense conditions of manually picking produce (e.g., in the sun and under hot conditions) may lead to health issues among workers.

Additionally, picking such produce mechanically has proved to be challenging. Mechanical systems cannot easily vary the force applied to such produce, leading to damage to the produce picked, including bruising, rupturing, and other damage that may make fruit unmarketable. Additionally, as produce grow in different sizes, picking produce of such different sizes is also difficult for mechanical systems. A mechanical system calibrated to pick produce of one size may be ill-suited to picking produce of another size as, for example, such a mechanical system may have trouble gripping the different size produce, have a gripping force that may be damaging to the different size produce, and/or may be ill suited to pick from the environment that the various produce grows within (e.g., grown on trees versus grown on the ground). Thus, improved picking systems are needed.

SUMMARY

Systems and methods are disclosed, in accordance with one or more embodiments, for a robotic gripper for holding and manipulating objects. For example, in accordance with an embodiment of the invention, an apparatus may be provided that may include a base, a plurality of fingers coupled to the base and arranged to define a containment area, and a controller configured to operate the drive motors to move the belts in a retract direction to move an external object into the containment area. Each finger may include a mechanical assembly defining a belt path, a belt positioned within the belt path, and a drive motor configured to operate the belt.

In another embodiment, a method may be provided that may include positioning a plurality of fingers of a robotic gripper to contact an external object, where each finger comprises a mechanical assembly defining a belt path, a belt positioned within the belt path, and a drive motor configured to operate the belt and operating the drive motors to move the belts in a retract direction to move the external object into a containment area.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Described herein are robotic systems that include robotic grippers for holding and manipulating objects. The robotic grippers can include one or more belts that may be driven, for example, independently (e.g., individually) and/or together in various embodiments. The belts can be configured to move an external object and/or position the external object within the robotic gripper. Additionally, the robotic gripper and/or the belts can include features that provide compliance to prevent damage to the object gripped and/or prevent damage from the robotic gripper contacting other surfaces and/or objects.

The robotic systems described herein may allow for accurate and quick picking of objects without damage to the object and/or the robotic system. The robotic grippers of the robotic systems may be configured to receive and move an object into a containment area of the robotic gripper, even if the robotic gripper is misaligned. Such movement may be accomplished with movement of belts of the robotic gripper that allows for a misaligned gripper to still pick an object, as well as surfaces of the belts configured to grip the objects. The robotic gripper may reposition any object that is improperly positioned. Additionally, the robotic gripper may be configured to grip objects of different sizes with substantially similar forces, preventing damage to objects when picking objects of various different sizes. Furthermore, the robotic gripper may be configured to absorb impacts with the environment without damage to the robotic gripper.

Figure 1:
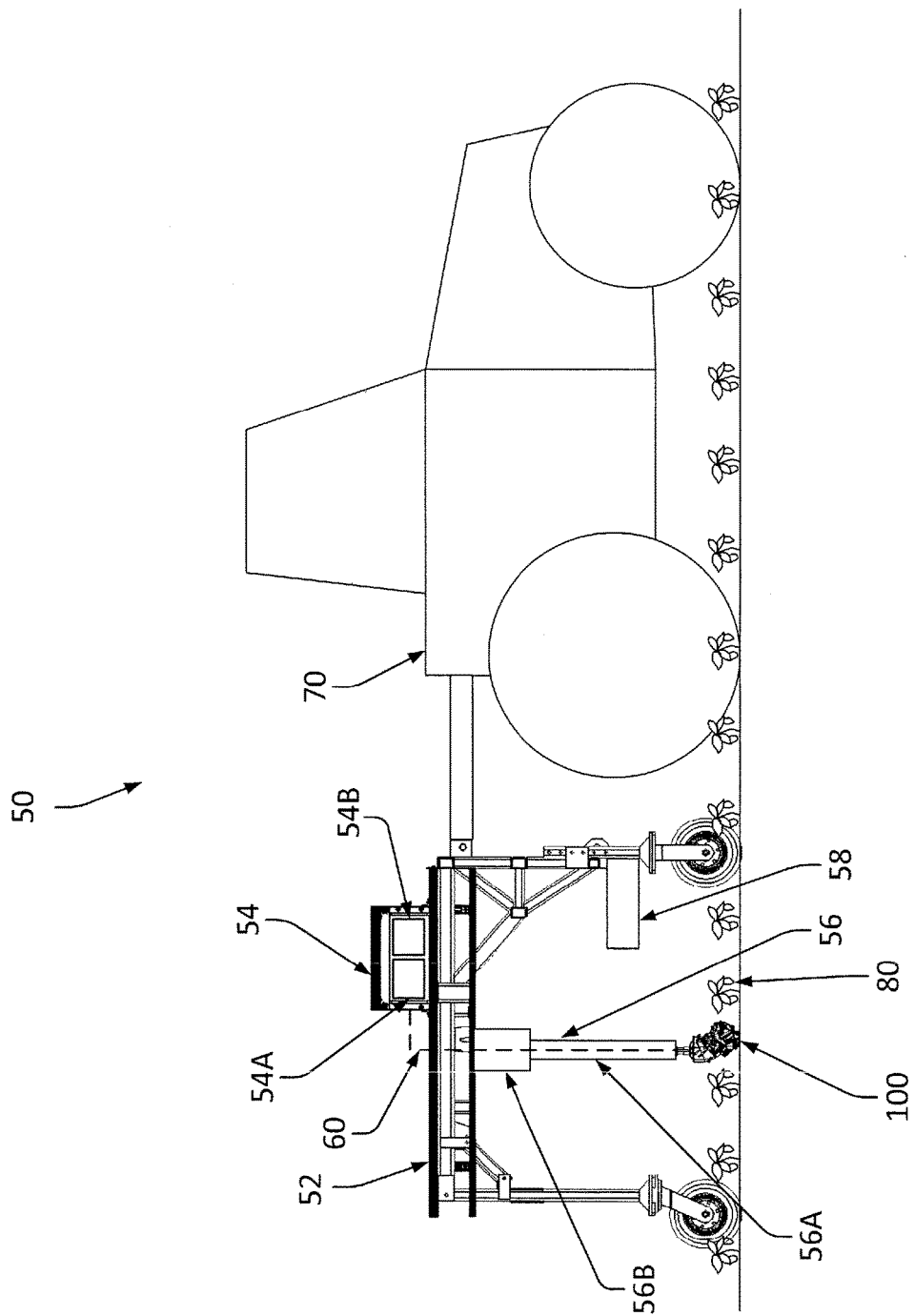
FIG. 1 illustrates a robotic system in accordance with one or more embodiments of the invention.

FIG. 1 illustrates a robotic system in accordance with one or more embodiments of the invention. Robotic system 50 shown in FIG. 1 includes platform 52, controller 54, robotic arm assembly 56, container 58, motive system 70, and robotic gripper 100. As shown in FIG. 1, robotic system 50 may be traversing through a field and robotic gripper 100 may be configured to pick fruits, vegetables, and/or other objects from plant 80 and/or other delicate objects.

Motive system 70 may be configured to move robotic system 50 through the environment. Motive system 70 may be an appropriate mobile system include, for example, a wheeled vehicle (e.g., an automobile, tractor, ATV, motorcycle, and/or other such vehicle), a tracked vehicle, livestock borne platform, drone platform, flying vehicle, hovercraft, or a wheeled cart pushed/pulled by a user.

Platform 52 may be coupled to motive system 70. Platform 52 may be mechanically fastened (e.g., bolted), adhered (e.g., through adhesives, welding, or other techniques), and/or integrated within motive system 70. Platform 52 may be configured to hold and/or couple to various other components of the robotic system 50 described herein.

For example, platform 52 may be configured to hold and/or be coupled to controller 54, robotic arm assembly 56, container 58, motive system 70, and/or robotic gripper 100. Platform 52 may be a spaceframe, monocoque, exoskeleton, and/or other type of structure. In various embodiments, platform 52 may include features to allow the various components to couple to platform 52. Additionally, platform 52 may include a plurality of layers and each such layer may be configured to receive one or more components.

Controller 54 may be configured to control operation of robotic system 50. In certain embodiments, controller 54 may include one or more controllers configured to govern the operation of robotic system 50 and/or one or more systems and/or subsystems thereof. Controller 54 may include, for example, a processor 54A that may be a single-core or multi-core processor or microprocessor, a microcontroller, a logic device, a signal processing device, memory for storing executable instructions (e.g., software, firmware, or other instructions), and/or any elements to perform any of the various operations described herein. In various embodiments, controller 54 and/or its associated operations may be implemented as a single device or multiple devices (e.g., communicatively coupled through communication channel 60 which may be analog, wired, or wireless connections) to collectively constitute the controller 54.

Controller 54 may include one or more memory components or devices 54B to store data and information. Memory 54B may include volatile and non-volatile memory, including non-transitory machine readable medium and/or memory. Examples of such memories include RAM (Random Access Memory), ROM (Read-Only Memory), EEPROM (Electrically-Erasable Read-Only Memory), flash memory, and/or other types of memory. In certain embodiments, controller 54 may be adapted to execute instructions stored within memory 54B to perform various methods and processes described herein, including implementation and execution of control algorithms responsive to external (e.g., sensor or operator) inputs.

In certain embodiments, controller 54 may be communicatively coupled (e.g., communicatively coupled through communication channel 60) to one or more systems and/or subsystems of robotic system 50. Controller 54 may then receive input from and/or communicate instructions to such systems or subsystems via the communications couplings.

One such system that controller 54 may communicate (e.g., through communication channel 60) with is robotic arm assembly 56. Robotic arm assembly 56 may include a robotic arm 56A that includes one or more arm links, actuators 56B to move the arm links of the robotic arm 56A, sensors for sensing environmental and operating conditions, and/or other such components for operation of robotic arm assembly 56. In certain embodiments, one or more such components, such as the sensors, may be separately coupled to platform 52, controller 54, motive system 70, and/or one or more other systems.

Each of the one or more arm links of the robotic arm 56A may move independently of the other arm links. The arm links may translate, rotate, and/or otherwise move relative to each other. The actuators 56B may be, for example, hydraulic actuators, electric motors, piezoelectric motors, combustion engines, and/or other devices that may move one or more such arm links. In certain embodiments, the robotic arm 56A may be configured to move robotic gripper 100 fore and aft relative to platform 52, side to side relative to platform 52, vertically up and down, and/or rotate robotic gripper 100. Robotic gripper 100 may then be manipulated to be positioned to move and/or hold an external object. In certain embodiments, robotic gripper 100 may be a part of robotic arm assembly 56 and may, for example, be integrated within the robotic arm 56A. However, other embodiments, may include a robotic gripper 100 configured to be coupled to the robotic arm 56A. Such a robotic gripper may be a modular gripper that may be configured to be coupled to a variety of different robotic arms.

As such, for example, robotic system 50 may be moved through a field, one or more sensors coupled to platform 52 may detect the presence of an object (e.g., fruit and/or vegetable), and controller 54 may provide instructions for the robotic arm assembly 56 to move robotic gripper 100 towards the object. When robotic gripper 100 is positioned adjacent to the object, robotic gripper 100 can then pick up the object from plant 80, detach the object from plant 80, sort the object (e.g., sort based on size, color, and/or ripeness), and place the object within container 58. Various features of robotic system 50, robotic arm assembly 56, robotic gripper 100, and techniques to operate thereof may be described in further detail herein.

Figure 2A:
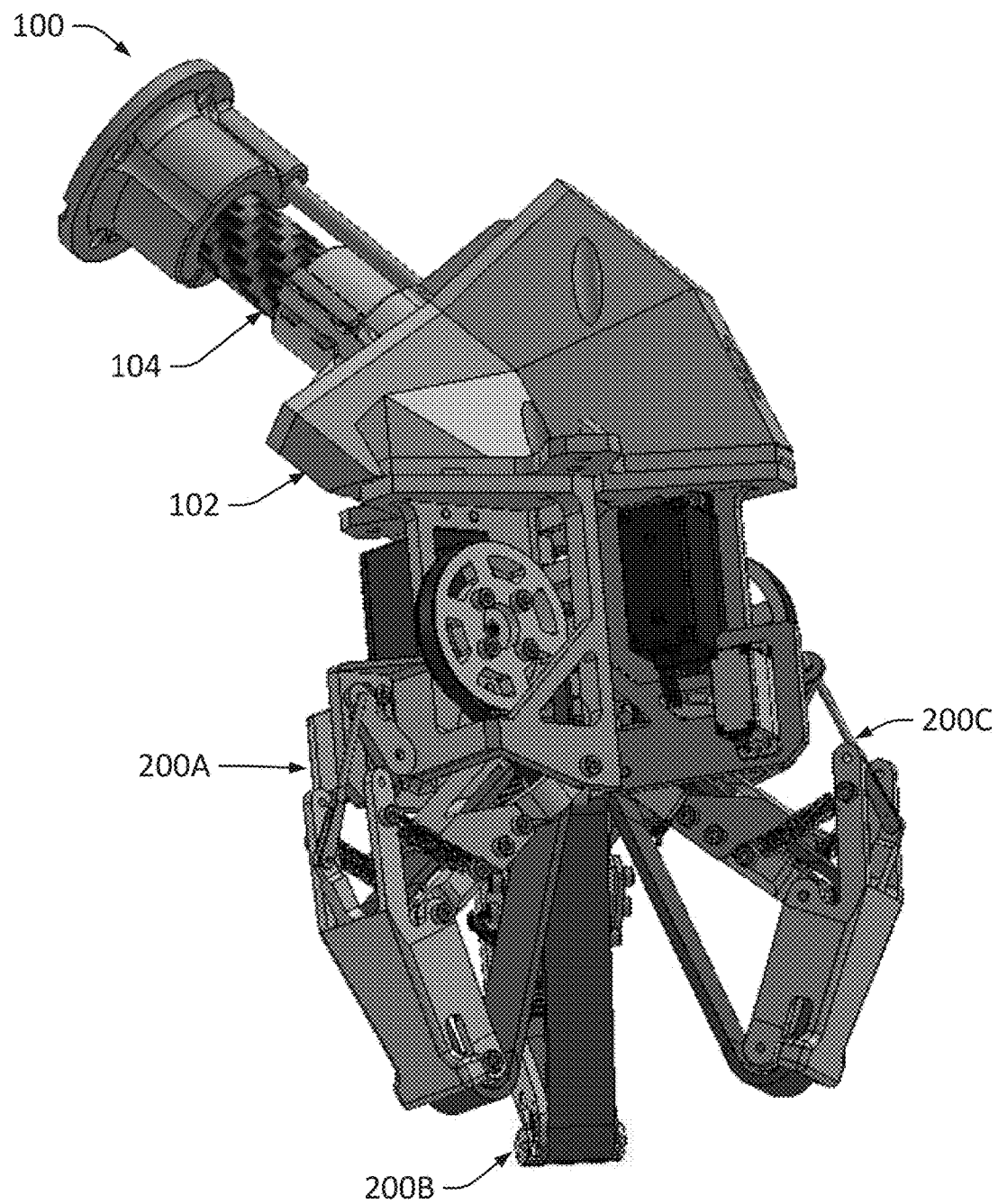
FIGS. 2A-D illustrate various configurations of a robotic gripper used with the robotic system of FIG. 1 in accordance with one or more embodiments of the invention.
Figure 2B:
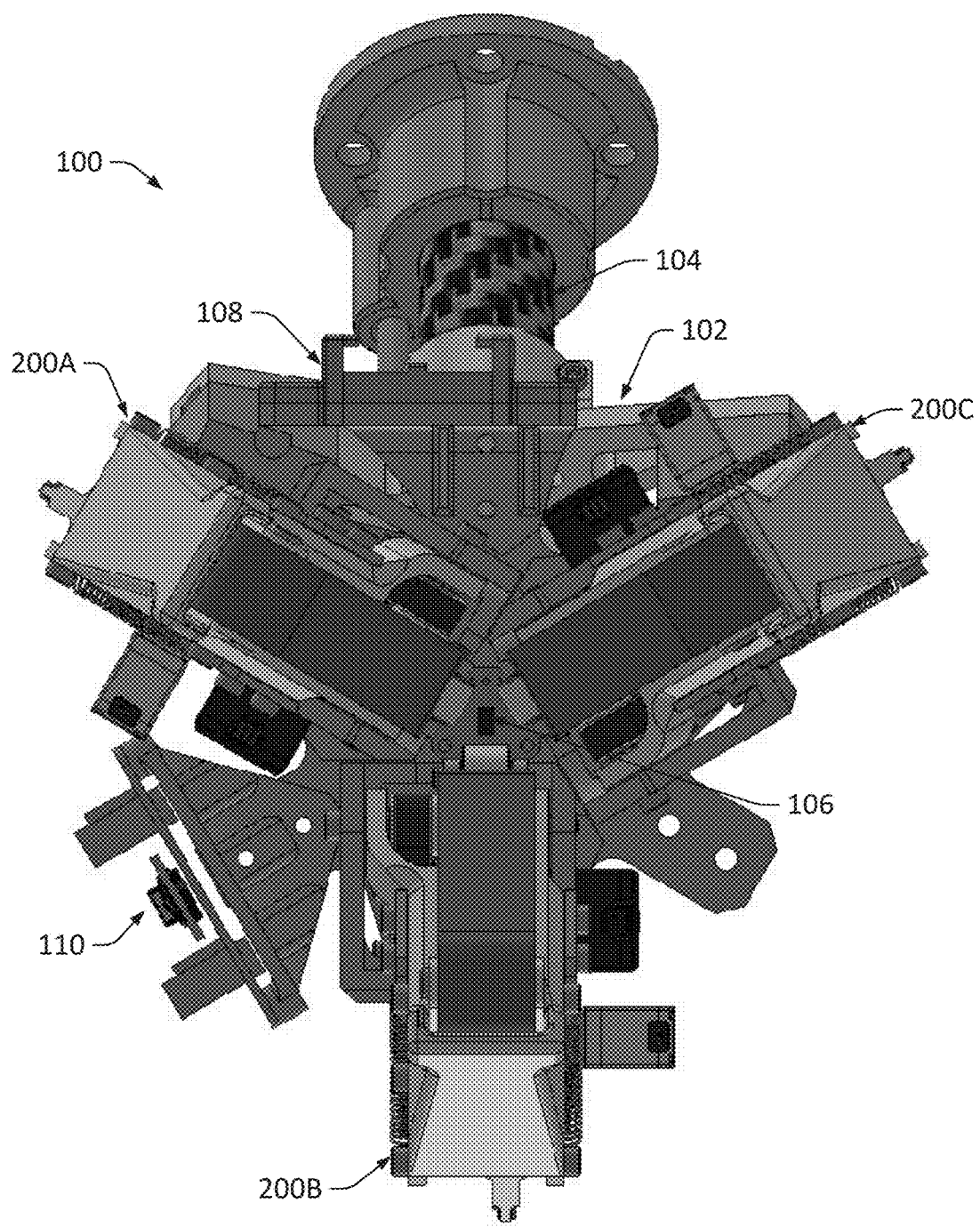
Figure 2C:
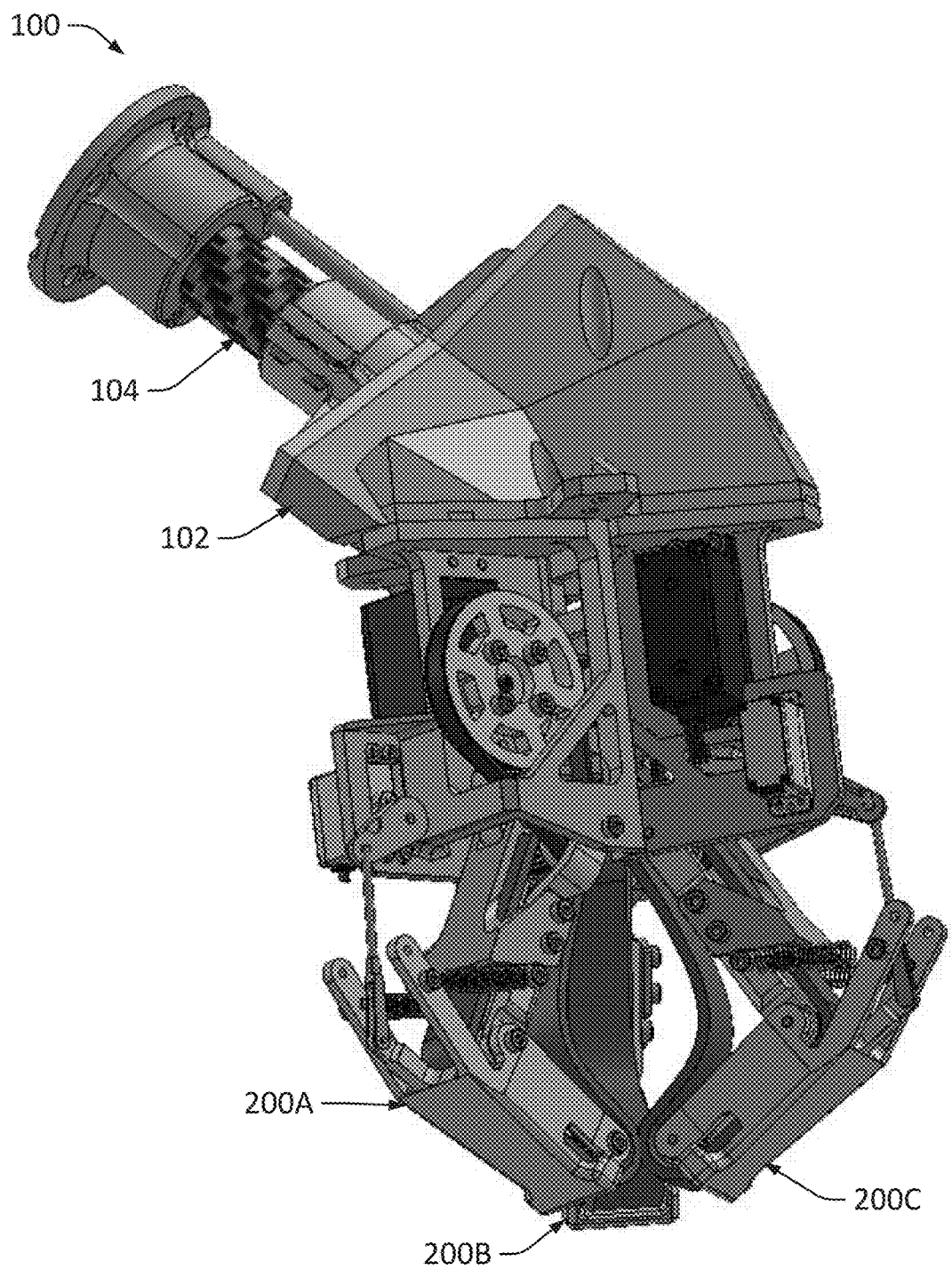
Figure 2D:
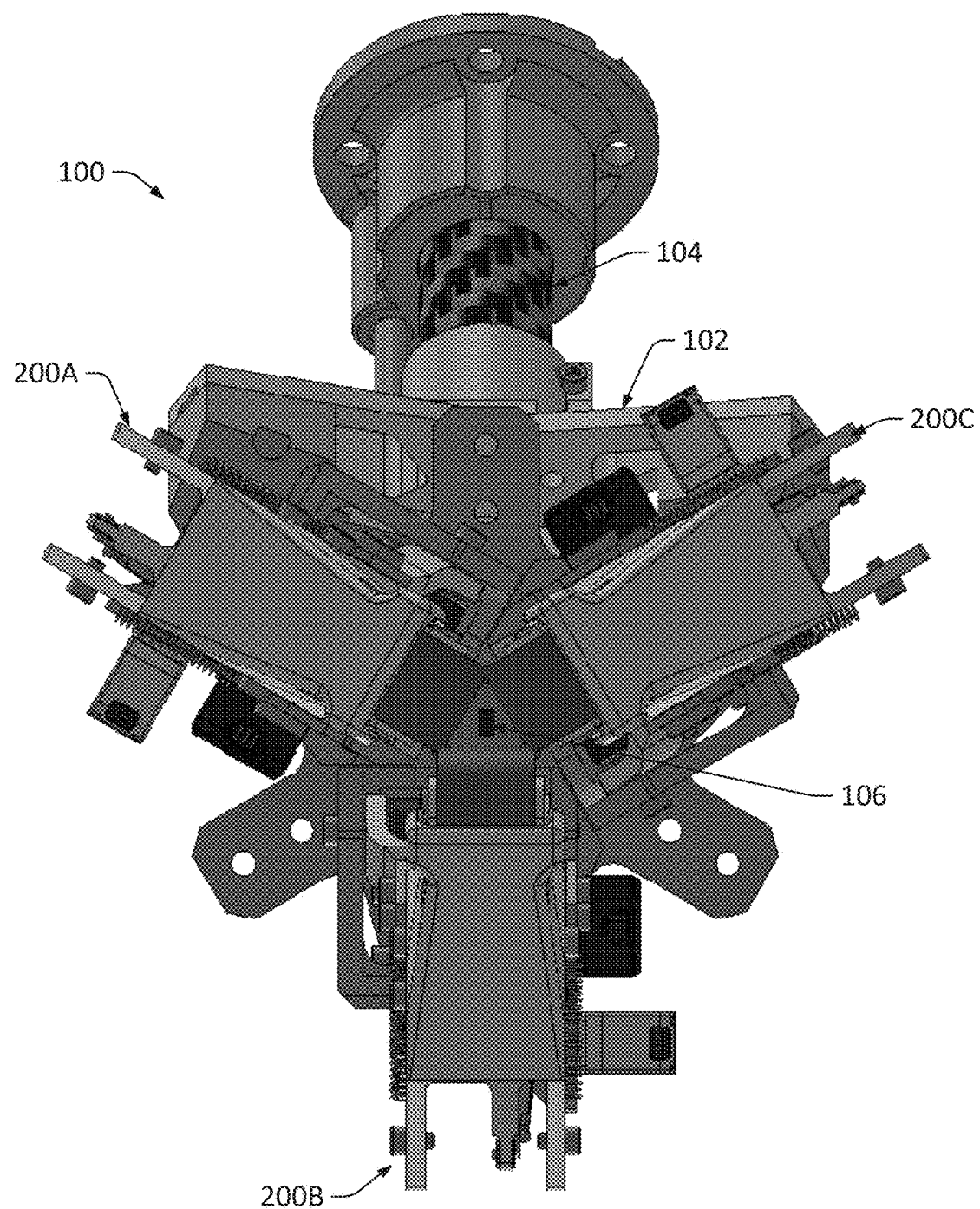

FIGS. 2A-D illustrate various configurations of a robotic gripper 100 used with the robotic system 50 of FIG. 1 in accordance with one or more embodiments of the invention. FIGS. 2A and 2B show perspective and bottom views, respectively, of robotic gripper 100 while in an open position while FIGS. 2C and 2D show perspective and bottom views, respectively, of robotic gripper 100 in a closed position. In the open position, robotic gripper 100 may be configured to receive an object (e.g., prepare to grasp or hold an object or allow the object to be inserted into the fingers of the robotic gripper 100). In the closed position, robotic gripper 100 may be configured to hold an object or move an object being held within the fingers of the robotic gripper 100.

Robotic gripper 100 includes a base 102, a robotic arm coupling 104, distance sensor 106, camera mount 108, gripper controller 110, and a plurality of fingers 200A-C. While the embodiment shown in FIGS. 2A-D includes three such fingers, other embodiments may include one finger, two fingers, or four or more fingers. As such, in various embodiments, the robotic gripper may include any number of fingers.

Robotic arm coupling 104 and the fingers 200A-C may couple to base 102. Base 102 may include features configured to receive robotic arm coupling 104 and the fingers 200A-C. While certain embodiments may include a base 102 configured to receive a set amount of fingers 200A-C, other embodiments may include a base 102 configured to receive different numbers of fingers. In such embodiments, fingers may thus be modularly added to base 102 in response to the configuration of the robotic gripper desired.

Robotic arm coupling 104 may be configured to couple robotic gripper 100 to a robotic arm assembly 56. As such, robotic gripper 100 may be a modular gripper and may be configured to couple to a variety of robotic arms. Robotic arm coupling 104 may couple to various robotic arm assemblies through one or more fastening techniques such as screws, friction fits, adhesives, and/or other such features. As shown in FIGS. 2A-D, robotic arm coupling 104 may include a plurality of screw holes that screws and/or bolts may be inserted into to couple to a robotic arm 56A.

Distance sensor 106 may detect the presence and/or distance from distance sensor 106 of one or more objects proximate to robotic gripper 100. In various embodiments, distance sensor 106 may be, for example, a proximity sensor such as a capacitive, radar, infrared, Doppler, magnetic, optical (e.g., visual camera), sonar, ultrasonic, fiber optic, laser, and/or other such type of sensor which may, in some embodiments, include additional processors and/or memory to perform distance calculations as appropriate. In certain embodiments, distance sensor 106 may be configured to detect objects within a set distance and/or a set area or volume. For example, one or more controllers (e.g., controller 54 and/or gripper controller 110) described herein may be configured to determine the presence, position (e.g., distance from distance sensor 106), and/or orientation of an object within a containment area (e.g., containment area 602 shown in FIGS. 6A-C) between (e.g., defined by) the plurality of fingers 200A-C. Distance sensor 106 may output distance data to such controllers and such controllers (e.g., controller 54 and/or gripper controller 110) may then determine the presence, position, and/or orientation of the object and output such presence, position, and/or orientation using the distance data.

Camera mount 108 may be configured to receive one or more visual cameras. In certain embodiments, such a visual camera may additionally aid in operation of robotic gripper 100, but in other embodiments the camera may be used to capture still images and/or video. The camera may be configured to output data to controller 54 and/or gripper controller 110. The camera may be a camera integrated with robotic system 50 and/or be an externally provided camera (e.g., provided by a user of robotic system 50).

Gripper controller 110 may be configured to control operation of robotic gripper 100. Similar to controller 54, gripper controller 110 may include a single-core or multi-core processor or microprocessor, a microcontroller, a logic device, a signal processing device, memory for storing executable instructions (e.g., software, firmware, or other instructions), and/or any elements to perform any of the various operations of the robotic gripper 100 described herein. In various embodiments, gripper controller 100 and/or its associated operations may be implemented as a single device or multiple devices (e.g., communicatively coupled through analog, wired, or wireless connections).

In certain embodiments, gripper controller 110 may be communicatively coupled to one or more components of robotic gripper 100. Such systems can include fingers 200A-C, distance sensor 106, one or more other sensors and/or cameras, and/or other such systems. Gripper controller 110 may then receive input from and/or communicate instructions to such systems.

Each of fingers 200A-C may one or more mechanical assemblies, a belt coupled to the mechanical assembly, and a driver motor configured to operate the belt. In certain embodiments, each mechanical assembly may include one or more finger links. One or more springs may be coupled to the finger links and configured to impart a force on the finger links. The force may impart a force on the finger links to provide tension to the belt. The fingers of the robotic gripper 100 may be described in further detail herein.

Figure 3A:
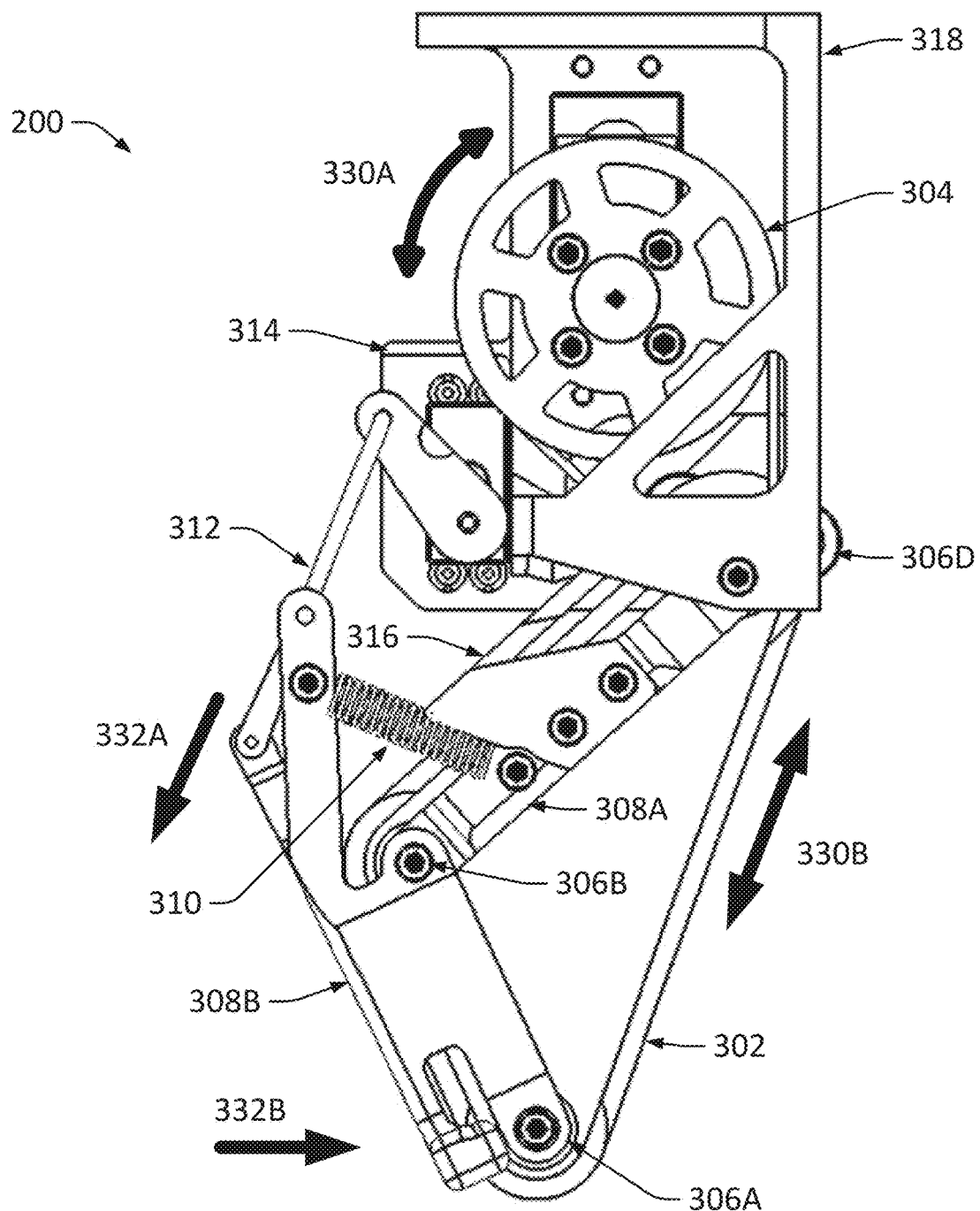
FIGS. 3A and 3B illustrate various configurations of a finger of the robotic gripper of FIGS. 2A-D in accordance with one or more embodiments of the invention.
Figure 3B:
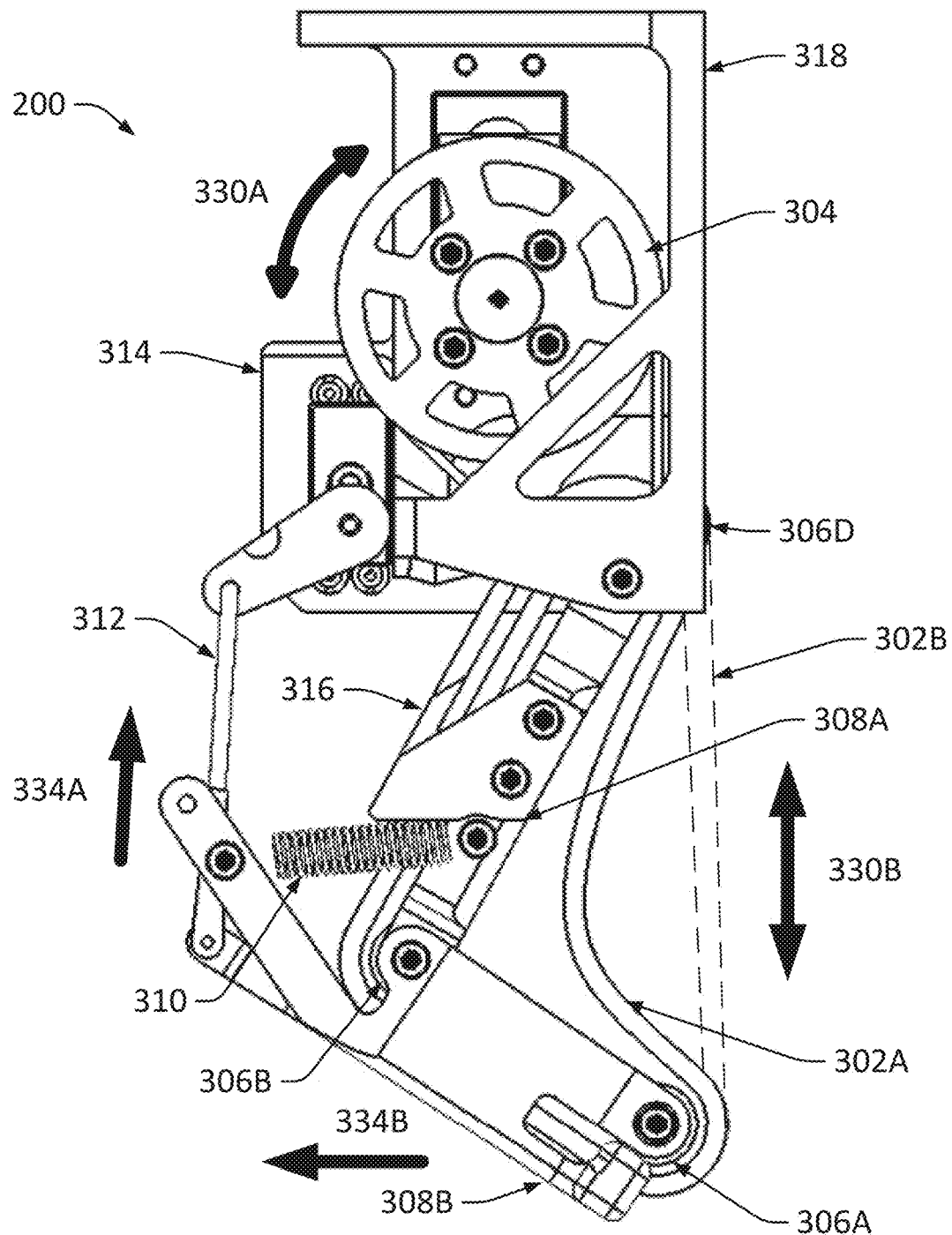

FIGS. 3A and 3B illustrate various configurations of a finger of the robotic gripper of FIGS. 2A-D in accordance with one or more embodiments of the invention. FIG. 3A shows a side view of finger 200 while in an open position. FIG. 3B shows a side view of finger 200 while in a closed position.

Finger 200 includes belt 302, drive motor 304, bearings 306A-C, finger links 308A and 308B, spring 310, a finger actuator linkage 312, a finger actuator 314, belt sheath 316, and a finger frame 318. Various components of finger 200 may be coupled to finger frame 318. In certain embodiments, finger frame 318 may then be coupled to base 102 via any of the techniques described herein.

Finger links 308A and 308B may form the mechanical assembly, as shown in FIGS. 3A and 3B. Other embodiments may include mechanical assemblies of other amounts of finger links, such as one finger link, three finger links, or four or more finger links. Finger link 308B may be coupled to finger link 308A and may move relative to finger link 308A. For example, finger link 308B may translate, rotate, and/or otherwise move relative to finger link 308A. Additionally, finger link 308A may also move, independently or dependently, relative to finger frame 318 (e.g., by rotating, translating, or otherwise move). As such, one or more of finger links 308A and 308B may include bearings, joints, or other mechanisms that allow such movement. In certain embodiments, such bearings, joints, or other mechanisms may also include features to allow movement of belt 302 relative to finger links 308A and 308B.

Finger links 308A and/or 308B may be made from any appropriate material, such as machined, cast, and/or sintered metals (e.g., aluminum, steel, iron, titanium, copper, and/or other such metals), composites (e.g., carbon fiber, fiberglass, and/or other such composites), plastics (e.g., acrylonitrile butadiene styrene (ABS), thermoplastic elastomers (TPE), and/or other plastics), wood, acrylic, and/or other such materials.

Additional compliance may be provided by spring 310. Spring 310 may be a leaf spring, tension spring, compression spring, torsion spring, and/or other such spring. Spring 310 may be coupled at one portion (e.g., a first end) to first finger link 308 and may be coupled at another portion (e.g., a second end) to second link finger 308. Spring 310 may be configured to impart a force on first finger link 308A and/or second finger link 308B to provide tension to belt 302.

Compliance (e.g., elastic body deflection and/or deformation due to an input force) from belt 302 and spring 310 may allow for a variety of different sized objects to be delicately grasped and firmly retained without damaging such objects. Belt 302 and spring 310 may allow for relatively similar force to be applied to different sized objects grasped by robotic gripper 100 by, for example, allowing for belt 302 to compliantly deform according to the different sizes of the object. Spring 310 may additionally allow for fingers 200A-C to grasp objects of even greater size differences while firmly retaining such objects.

In certain embodiments, spring 310 may be configured to not impart force on first finger link 308A and/or second finger link 308B when first finger link 308A and second finger link 308B are within a first position configuration and configured to impart force when first finger link 308A and second finger link 308B are within a second position configuration. As such, only when first finger link 308A and second finger link 308B are disposed relative to each other in a certain pre-defined configuration would spring 310 impart a force on first finger link 308A and/or second finger link 308B.

For example, spring 310 may be configured to impart force when first finger link 308A is disposed relative to second finger link 308B at an angle smaller than a threshold angle. At such an angle smaller than the threshold angle, spring 310 (which may be a tension spring) may then stretch and impart a force on first finger link 308A and second finger link 308B. Such a force may be a force that attempts to return the angle between first finger link 308A and second finger link 308B to an angle greater than the threshold angle, but may still allow for disposing first finger link 308A relative to second finger link 308B at an angle less than the threshold angle in response to an outside force (e.g., robotic finger 200 contacting an external surface such as the ground) manipulating first finger link 308A and second finger link 308B to be disposed relative to each other at an angle smaller than the threshold angle.

In addition, finger actuator linkage 312 and finger actuator 314 may move second finger link 308B relative to first finger link 308A by moving finger actuator linkage 312 downward. Finger actuator 314 may be, for example, an electric motor, a hydraulic actuator, a servo, a piezoelectric motor, a combustion engine, and/or another such device. As shown herein, finger actuator 314 may be a servo configured to move finger actuator linkage 312 between at least a plurality of positions, including an extended position and a retracted position. The retracted position may be shown in FIG. 3A and, in the retracted position, the finger 200 may be in the open position. The extended position may be shown in FIG. 3B and, in the extended position, the finger 200 may be in the closed position.

For example, from the retracted position with finger 200 in the open position, finger actuator 314 may then move finger actuator linkage 312 in direction 332A. Movement of finger actuator linkage 312 in direction 332A may then move second finger link 308B in direction 332B, leading to finger 200 being in the closed position. In certain embodiments, spring 310 may, in response to moving finger actuator linkage 312 downward in direction 332A, provide further force to return first finger link 308A to an angle relative to second finger link 308B that is greater than the threshold angle. However, as finger actuator linkage 312 forces second finger link 308B, such a force may instead also move first finger link 308A inward, further closing finger 200.

Belt 302 may be a compliant belt configured to hold and/or grip an object. Belt 302 may be compliant in that, in response to a force exerted on belt 302, belt 302 may stretch and/or deflect. Thus, belt 302 may deflect when holding an object. Additionally, belt 302 may also deflect if one or more of finger links 308A and/or 308B are subject to an outside force. Finger links 308A and/or 308B may move in response to the force and belt 302 may deflect to allow such movement. Thus, damage to finger 200 may be prevented due to compliance of belt 302.

Belt 302 may be a multi-layer belt. For example, belt 302 may be a multi-layer belt with a rubber layer configured to contact bearings 306A-D and a silicone layer configured to contact, hold, and/or grasp the object. In certain embodiments, at least the outside face of belt 302 (e.g., the silicone layer) may be a high friction surface that may, for example, be sticky or tacky to improve grip of the object. The inside face of belt 302 may be configured to move in response to rotation of bearings 306A-D. Thus, belt 302 may be driven by at least one of bearings 306A-D.

Bearings 306A-D may support belt 302 and allow belt 302 to move relative to the finger links 308A and 308B. In certain embodiments, bearing 306B may be configured to allow second finger link 308B to move relative to first finger link 308A and bearing 306C (not shown in FIGS. 3A and 3B, but shown in FIG. 4) may be configured to allow first finger link 308A to move relative to finger frame 318.

Additionally, bearings 306A-D may be disposed in a non-linear fashion. For example, bearing 306A and 306B may form a line, but bearing 306C may be disposed outside of that line. Disposing such bearings in a non-linear fashion may allow for belt 302 to deflect and provide compliance without contacting other portions of finger 200.

Movement of belt 302 may be driven by drive motor 304. Drive motor 304 may, for example, be an electric motor, a hydraulic actuator, a servo, a piezoelectric motor, a combustion engine, and/or another such device. In the embodiment shown in FIG. 4, drive motor 304 may include a pulley that rotates to move a drive belt 320, and the drive belt 320 may rotate bearing 306C to move belt 302. Thus, rotation 330A of drive motor 304 may result in movement of belt 302 along directions 330B. Other embodiments may include other drivetrain configurations, including directly driving belt 302 with drive motor 304, as well as driving belt 302 via a transmission (for single speed drive motors to vary drive speed) and/or other such techniques. Drive motor 304 may be coupled to finger frame 318.

Drive motor 304 may be configured to operate at a plurality of different speeds to drive belt 302 at different speeds as needed. One of more controllers described herein may determine such conditions and, accordingly, provide instructions for drive motor 304 to operate at one of the different speeds. For example, different types of fruits or vegetables may require belt 302 to be operated at different speeds (e.g., fruits that bruise more easily may require belt 302 to be operated at a slower speed). Additionally, drive motor 304 may be operated at different speeds in extrude and retract directions.

Drive motor 304 may move belt 302 in directions 330B. In certain embodiments, drive motor 304 may move belt upward in a retract direction and an extrude direction. The retract direction may, for example, be configured so that, when belt 302 is touching and/or gripping an object, belt 302 may then move the object upward. The extrude direction may be configured so that belt 302 may move an object downward. In certain embodiments, belt 302 may move in the retract direction to pull an object into a containment area and move in the extrude direction to release the object. In such an embodiment, all belts of the fingers of the robotic gripper 100 may move substantially simultaneously. In other embodiments, individual belts of the fingers may move independently to further position the object within the containment area. Such movement is described further herein.

While FIG. 3A shows finger 200 in the open position, FIG. 3B shows finger 200 in the closed position. In the closed position, finger 200 may be configured to grip an object, deflect due to contact with an external surface, or simply move to such a configuration. When finger 200 is moved to the closed position while holding an object and/or deflecting due to contact with an external surface, belt 302 may provide compliance and deflect, such as to shape 302A. When finger 200 is simply moved to the closed position, spring 310 may provide a force to keep belt 302 taut, and so belt 302 may be in shape 302B.

Belt sheath 316 can be a belt sheath disposed partially or fully over belt 302. In certain examples, belt sheath 316 may be configured to realign a misaligned belt 302. For example, belt sheath 316 may include a surface that a misaligned belt 302 can press against. When the misaligned belt 302 presses against belt sheath 316, the surface of belt sheath 316 may be configured to realign belt 302 by, for example, settling belt 302 back on bearings 306A-D and thus realigning belt 302. In certain embodiments, belt sheath 316 may realign belt 302 when moving belt 302 is moved in one direction (e.g., in an extrude direction or a retract direction as described here), but other embodiments may realign belt 302 when belt 302 is moved in any direction.

In certain embodiments, belt sheath 316 may also form a protective cover over belt 302 or a portion thereof. As such, belt sheath 316 may protect belt 302 from environmental damage and may protect objects (e.g., fruits or vegetables) adjacent to belt 302 from damage from belt 302 (e.g., when belt 302 is spun). Furthermore, belt sheath 316 may also be formed to assist in keeping belt 302 engaged on bearings 306C-D even when belt 302 is not tensioned.

Figure 4:
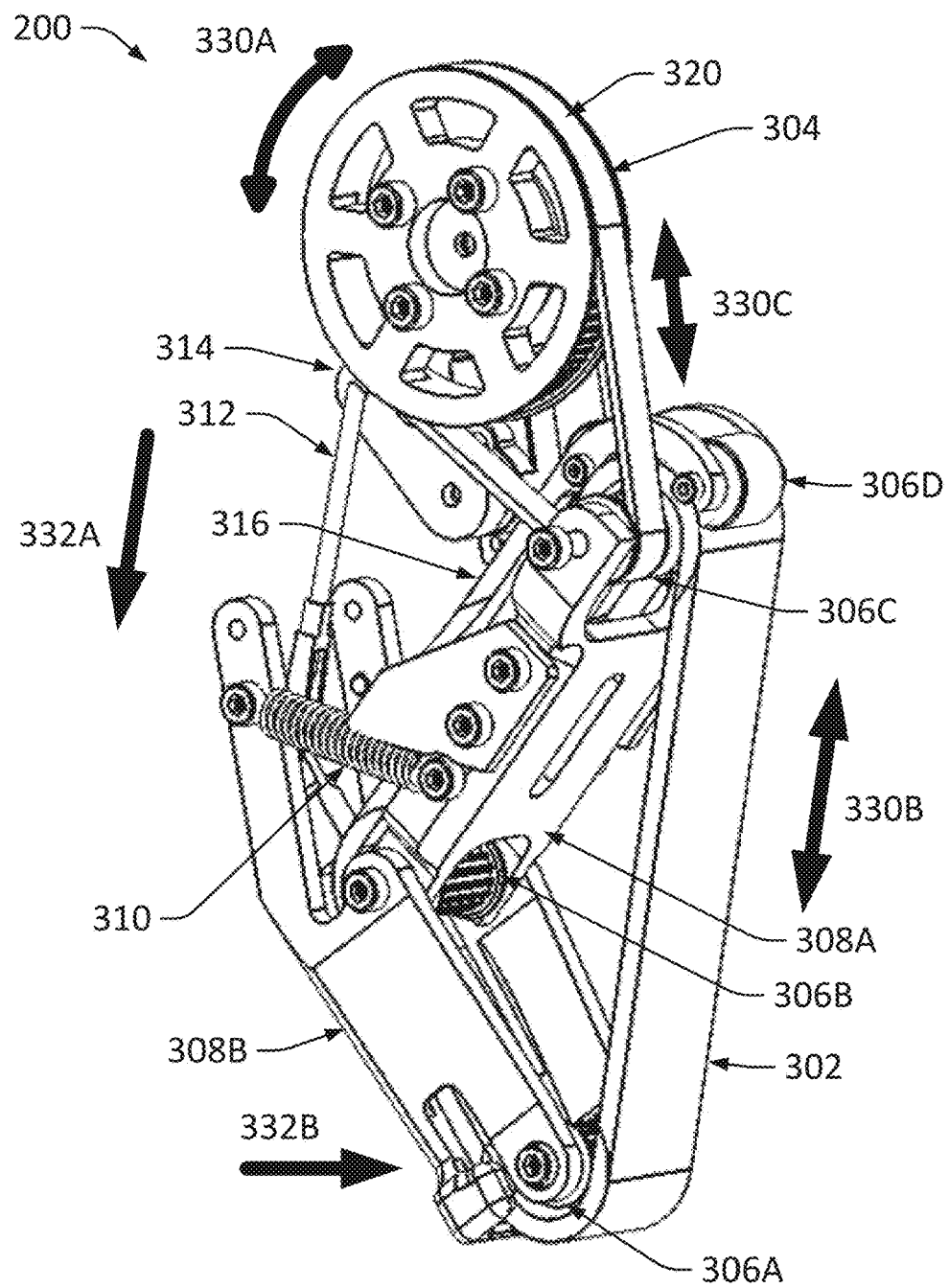
FIG. 4 illustrates a belt drive system for the finger of FIGS. 3A and 3B in accordance with one or more embodiments of the invention.

FIG. 4 illustrates a belt drive system for the finger of FIGS. 3A and 3B in accordance with one or more embodiments of the invention. FIG. 4 illustrates the components of finger 200 of FIGS. 3A and 3B that allows for manipulation of belt 302.

As shown drive motor 304 may rotate to move drive belt 320. Movement of drive belt 320 may rotate bearing 306C. Bearing 306C may include a first portion coupled to drive belt 320 and a second portion coupled to belt 302. The first portion and the second portion may be similar dimensions or may be different dimensions (e.g., diameters). Such dimensions may be varied due to gearing needs. When drive belt 320 rotates bearing 306C, bearing 306C then moves belt 302. Thus, drive motor 304 may then move belt 302. Other embodiments may include one or more additional belts, may directly drive belt 302 with drive motor 320, may include transmissions, and/or may include other techniques for driving belt 302.

While bearings 306A-C are disposed on inner sides of belt 302, bearing 306D may be disposed on an outside of belt 302. Thus, bearing 306D may be configured to aid in keeping belt 302 aligned on bearings 306A-C. Other embodiments may include additional bearings such as additional bearings on the inner or outer sides of belt 302. In certain embodiments, the inner side of belt 302 may be toothed and bearings 306A-C may be shaped accordingly to fit the teeth. The outer side of belt 302 may be smooth, or may be textured (e.g., toothed or formed with other textures or patterns for additional grip), and bearing 306D may also be shaped accordingly.

Figure 5:
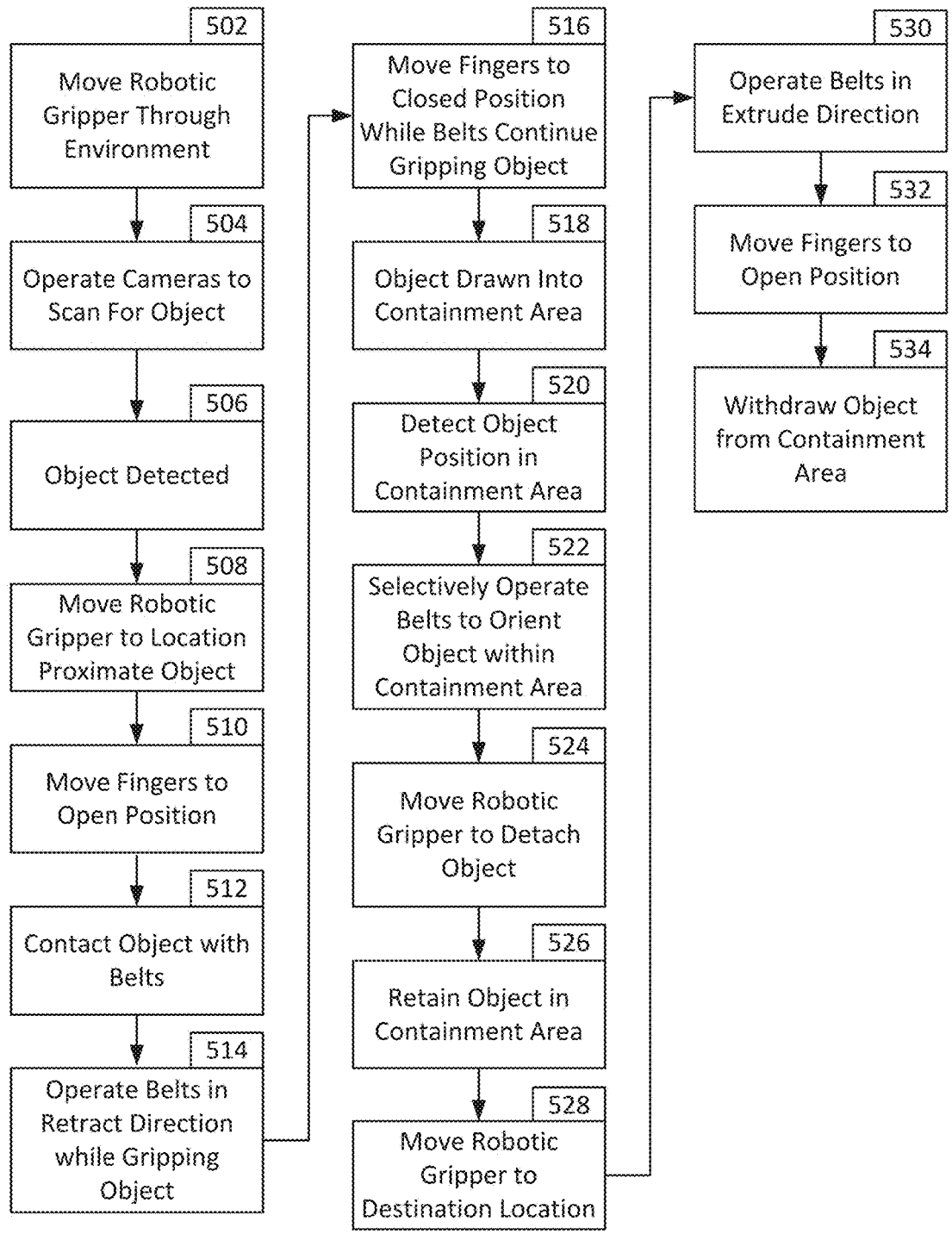
FIG. 5 is a flowchart describing operation of the robotic system of FIG. 1 in accordance with one or more embodiments of the invention.
Figure 6A:
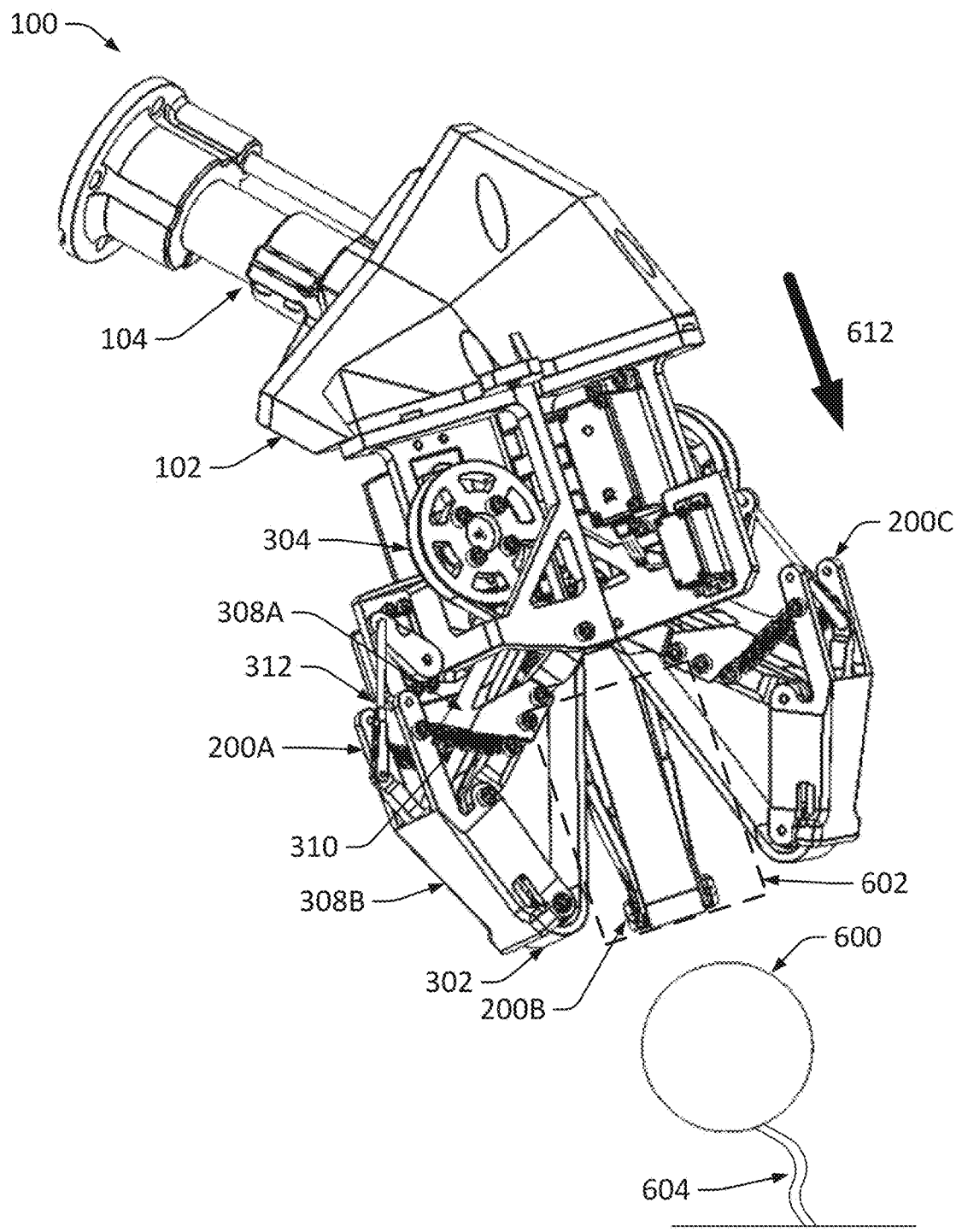
FIGS. 6A-C illustrate various stages of operation of the robotic gripper of FIGS. 2A-D, described in FIG. 5, in accordance with one or more embodiments of the invention.
Figure 6B:
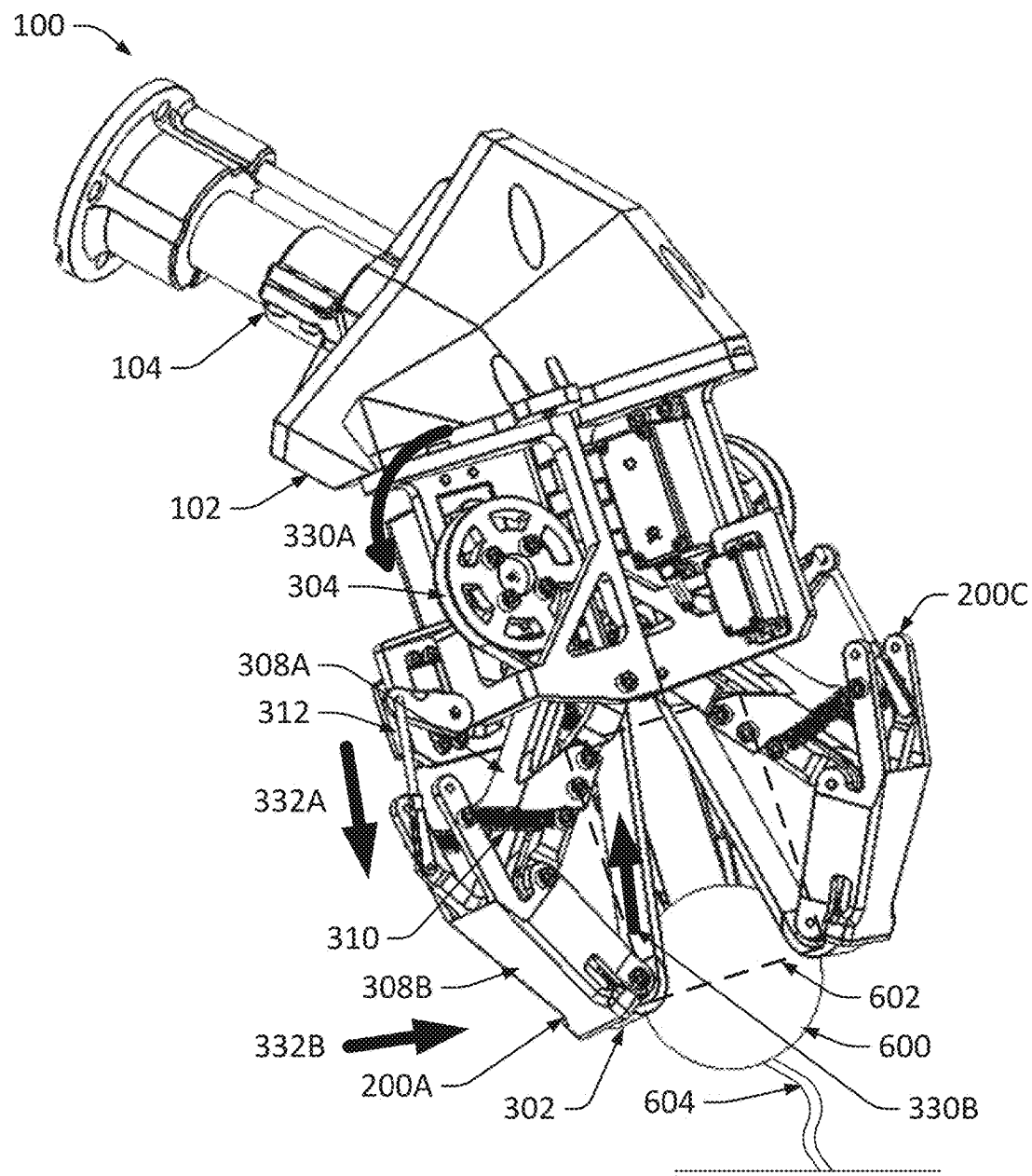
Figure 6C:
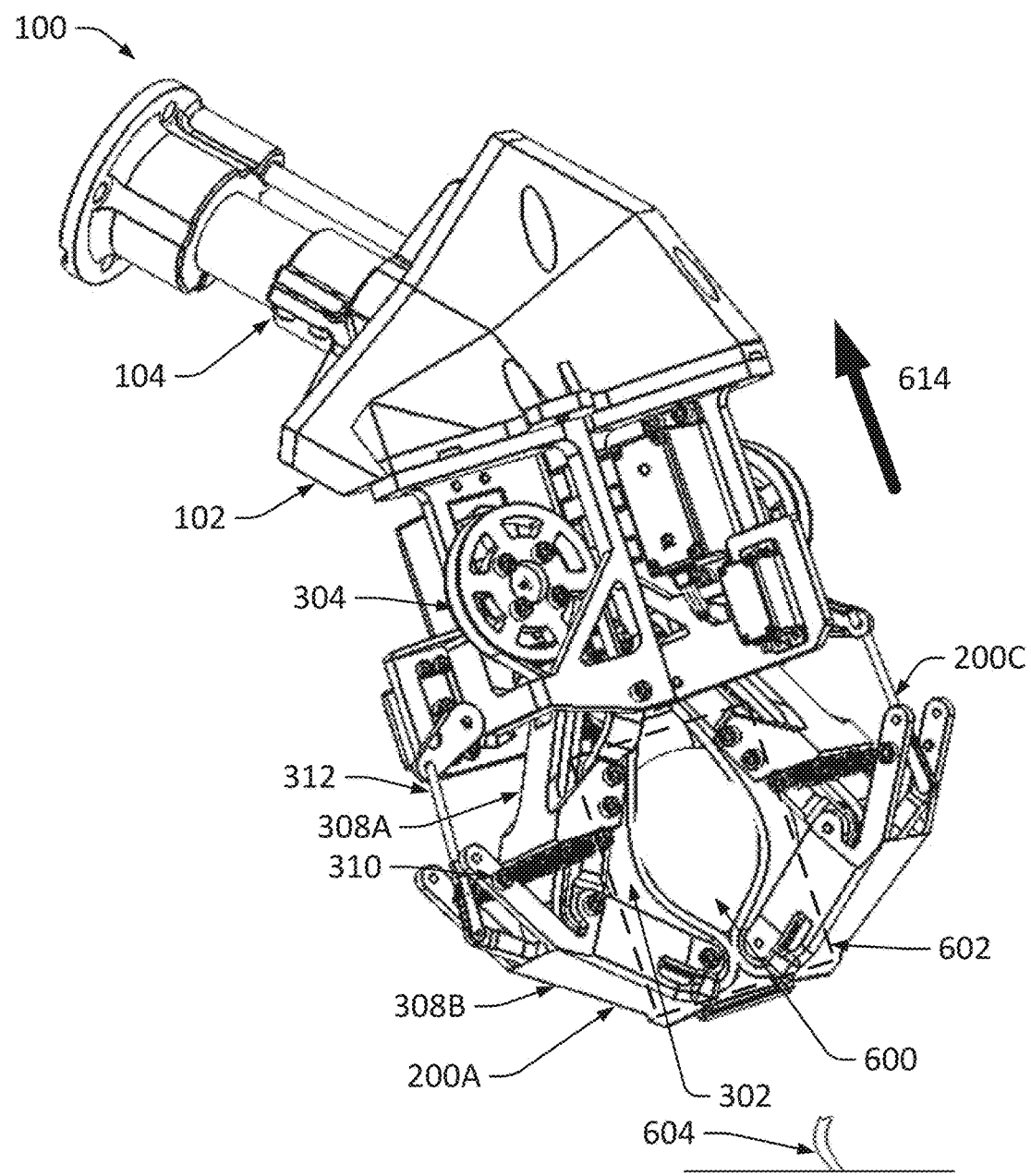

FIG. 5 is a flowchart describing operation of the robotic system of FIG. 1 in accordance with one or more embodiments of the invention. FIG. 5 may describe operation of robotic system 50. While FIG. 5 describes an embodiment of an operation of robotic system 50, other embodiments may include additional or fewer steps and/or may perform steps in different orders. The operations of FIG. 5 may be performed by robotic system 50 and controlled by one or more controllers described herein. FIGS. 6A-C illustrate various stages of operation of the robotic gripper of FIGS. 2A-D, described in FIG. 5, in accordance with one or more embodiments of the invention.

In step 502, robotic system 50 with robotic gripper 100 may be moved through an environment. The environment may be, for example, a factory floor, a farm, a residence, and/or other such environments where robotic system 50 may be configured to scan for and pick up objects. As described herein, robotic gripper 100 may be coupled to other components of robotic system 50.

In step 504, one or more scanners, such as cameras, of robotic system 50 may be operated to scan for objects within the environment. The scanners may provide visual data (e.g., video or still image data), thermal or radio-spectrum data, radar data, lidar data, scent data, and/or other such types of data. Robotic system 50 may be configured to scan for and pick up such objects. Such objects may be, for example, vegetables, fruits, grain, plants, parts, and/or other objects of interest.

In step 506, an object may be detected. The object may be detected via, for example, object recognition software analyzing data provided by the scanners in step 504. For example, a camera may provide visual data and certain fruits and/or vegetables of interest may be of a different shape and/or color from that of other items of the environment (e.g., from the soil, plants, leaves of the plants, and/or other items of the environment).

In step 508, motive system 70, platform 52, and/or robotic arm assembly 56 may move robotic gripper 100 proximate to the object. In step 510, fingers 200A-C may be moved to an open position. The open position may be configured to receive the object within fingers 200A-C and move the object of interest into a containment area. In certain embodiments, fingers 200A-C may be oriented in the open position before and/or during moving robotic gripper 100 proximate to the object.

FIG. 6A shows operation of robotic gripper 100 during steps 508 and 510. As shown in FIG. 6A, robotic gripper 100 may be moved in direction 612 towards object 600. Object 600 may be, for example, produce such as a fruit (e.g., strawberry, blueberry, blackberry, apple, peach, grapes, pear, melon, watermelon, cantaloupe, honeydew, bananas, kiwi, orange, tomato, cucumber, and/or other such fruits), vegetable (e.g., broccoli, lettuce, cauliflower, pepper, onion, and/or other such vegetables), or grains (e.g., corn or other such grains), parts for assembly, and/or another object of interest to be picked up by robotic gripper 100. Fingers 200A-C of robotic gripper 100 may be in the open position. Object 600 may not yet be disposed within containment area 602, which is defined as a volume between fingers 200A-C and contained by fingers 200A-C. Robotic gripper 100 may be configured to move object 600 into containment area 602, orient object 600 within containment area 602, transport object 600 to container 58, and deposit object 600 within container 58. Various embodiments may include containment areas different from containment area 602 illustrated in FIGS. 6A-C. In such embodiments, the containment area may be an area that the object can be held by the fingers.

Referring back to FIG. 5, in step 512, belts 302 of fingers 200A-C may contact object 600. Before, upon, or after contacting object 600 with one or more belts 302 of fingers 200A-C, belts 302 may be operated in a retract direction while such belts 302 are contacting and/or gripping object 600, as described in step 514.

Additionally, before, upon, or after contacting object 600 with one or more belts 302 of fingers 200A-C, fingers 200A-C may be moved to and/or moved towards the closed position in step 516. As performed by the embodiment described in FIG. 5, fingers 200A-C may move fingers 200A-C to the closed position when one or more of fingers 200A-C have contacted object 600. Moving belts 302 in the retract direction while belts 302 are contacting object 600 may thus draw object 600 into containment area 602, as described in step 518.

For example, as shown in FIG. 6B, drive motor 304 may be rotated in direction 330A. Rotation of drive motor 304 in direction 330A may result in movement of belts 302 in retract direction 330B. When moving in retract direction 330B, belts 302 may then move object 600 upward into containment area 602. Additionally, before, during, and/or after contacting object 600 with one or more of fingers 200A-C, finger actuator 314 may move finger actuator linkage 312 in direction 332A so that finger 200A is moved in direction 332B, closing finger 200A. Similar actions may be performed by fingers 200B and 200C. Moving fingers 200A-C to the closed position may aid in gripping and/or moving object 600 into containment area 602. Accordingly, belts 302 of fingers 200A-C may draw object 600 into containment area 602.

In step 520, data from distance sensor 106 may indicate the presence of object 600 within containment area 602. After detection of object 600 within containment area 602, data from distance sensor 106 may, additionally, be used to determine the orientation of object 600.

If object 600 is in a non-desired orientation, belts 302 of fingers 200A-C may be selectively operated (e.g., each of the individual belts 302 may be moved in the retract and/or extrude direction independently) to position object 600 in the desired orientation within containment area 602 in step 522. In certain embodiments, object 600 may be oriented while belts 302 are retracted and, thus, object 600 may be retracted into containment area 602 by belts 302 while at the same time being oriented by belts 302. For example, in some embodiments, steps 518 and 522 may be performed simultaneously. Accordingly, when both retracting and orienting object 600, some of belts 302 may be operated at speeds different than that of other belts 302.

In certain embodiments, object 600 may be attached to another object. For example, if object 600 is a fruit or vegetable, object 600 may be attached to a tree or plant via a stem 604. When data from distance sensor 106 indicates that object 600 is in containment area 602 and one or more controllers determines that object 600 is securely held (e.g., with fingers 200A-C in the closed position), robotic gripper 100 and/or robotic arm assembly 56 may be moved to detach object 600 from, for example, the tree or the plant in step 524. As such, robotic gripper 100 and/or robotic arm assembly 56 may move while holding object 600 to detach object 600. Upon being detached, object 600 may still be held within containment area 602 of robotic gripper 100 in step 526.

Such an operation is shown in FIG. 6C as object 600 is positioned within containment area 602. Robotic gripper 100 may then be moved in direction 614 to detach object 600 from stem 604. Object 600 may still be held within robotic gripper 100 after being detached. Due to the compliance of the robotic gripper 100 (e.g., the compliance of springs 310, belts 302, and/or compliance of other components), robotic gripper 100 may accelerate rapidly while gripping object 600 without damage to object 600.

In step 528, robotic arm assembly 56 may move robotic gripper 100 to a destination location (e.g., above container 58 in preparation for depositing object 600 within container 58). In steps 530 and 532, belts 302 may be moved in the extrude direction (e.g., by drive motor 304) and fingers 302A-C may be moved to the open position to withdraw object 600 from containment area 602, in step 534, and deposit object 600 within container 58. In various embodiments, steps 530 and 532 may be performed concurrently, or one after the other. In various embodiments, the steps identified herein may be performed in any order, including orders different from that described. In addition, various steps may be combined together, omitted, and/or additional steps may be added, as appropriate.

Figure 7:
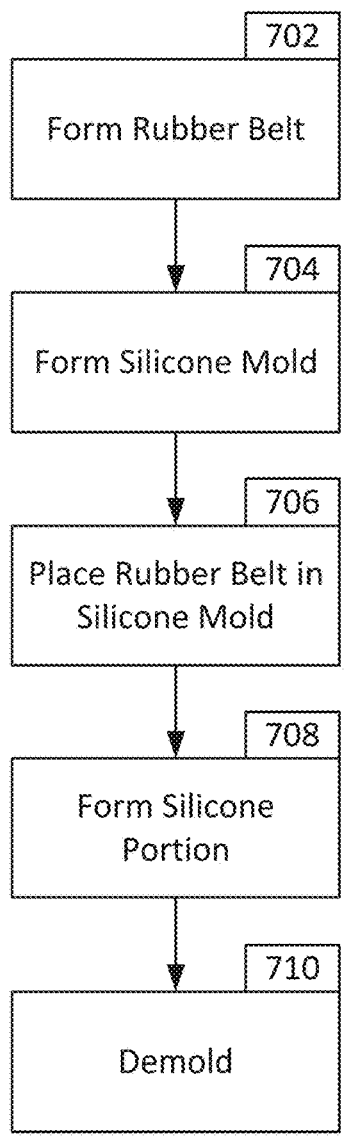
FIG. 7 is a flowchart describing a technique of forming a rubber belt of the robotic gripper of FIGS. 2A-D in accordance with one or more embodiments of the invention.

FIG. 7 is a flowchart describing a technique of forming a rubber belt of the robotic gripper of FIGS. 2A-D in accordance with one or more embodiments of the invention. Belt 302 may be a compliant belt that may stretch or deflect according to situational needs. Additionally, belt 302 may include a sticky surface to aid in gripping object 600. As such, belt 302 may be a multi-layer belt that includes layers of various properties. FIG. 7 details a technique of forming a two part belt, but other embodiments may include belts of three or more parts.

In step 702, a rubber belt may be formed. The rubber belt may be 3D printed and/or molded through other techniques. The rubber belt may be, for example, thermoplastic urethane (TPU), or another such material. In step 704, a silicone mold may be formed. The silicone mold may be 3D printed and may be made from various plastics (e.g., ABS, PLA, and/or other such plastic).

In step 706, the rubber belt may be placed in the silicone mold formed in step 704. The silicone portion may then be formed in the silicone mode (e.g., molded with the rubber belt positioned within the silicone mold). The silicone portion may be formed by, for example, pouring silicone into the silicone mold. Once the silicone portion has been formed and/or solidified, the completed belt may then be demolded in step 710.

As described herein, robotic system 50 may allow for accurate and quick picking of objects without damage to the object and/or the robotic system 50. Robotic gripper 100 may be configured to receive and move an object into containment area 602 of robotic gripper 100, even if robotic gripper 100 is misaligned. Such movement may be accomplished with movement of belts 302 of robotic gripper 100 that allows for a misaligned gripper to still pick an object, as well as surfaces of belts 302 that are configured to grip the objects through geometric features and/or material choice. Robotic gripper 100 may reposition any object that is improperly positioned within its grip. Additionally, robotic gripper 100 may be configured to grip objects of different sizes with substantially similar forces through compliance of belts 302 and/or springs 310, preventing damage to objects when picking objects of various different sizes. Furthermore, robotic gripper 100 may be configured to absorb impacts with the environment without damage.

Various embodiments of the invention may be implemented using hardware, software, or various combinations of hardware and software and/or may be combined into composite components comprising software, hardware, and/or both without departing from the scope and functionality of the invention. Various hardware components and/or software components set forth herein may be separated into subcomponents having software, hardware, and/or both without departing from the scope and functionality of the invention. Where applicable, it is contemplated that software components may be implemented as hardware components and vice-versa.

Software, in accordance with the invention, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
    a base;
    a plurality of fingers coupled to the base and arranged to define a containment area, wherein each finger comprises:
        a mechanical assembly defining a belt path, the mechanical assembly comprising: a first finger link and a second finger link coupled to the first finger link and configured to move relative to the first finger link,
        a belt positioned within the belt path and configured to rotate about both the first finger link and the second finger link during operation, and
        a drive motor configured to operate the belt; and
    a controller configured to operate the drive motors to move the belts in a retract direction to move an external object into the containment area.

2. The apparatus of claim 1, wherein the controller is further configured to operate the drive motors to move the belts in an extrude direction to withdraw the external object from the containment area.

3. The apparatus of claim 1, wherein the controller is further configured to selectively operate each of the drive motors individually to operate each of the belts individually to selectively orient the object within the containment area.

4. The apparatus of claim 1, wherein each finger further comprises an actuator configured to move the first finger link, the second finger link, or both to move the mechanical assembly between an open position and a closed position.

5. The apparatus of claim 4, wherein the controller is configured to move the mechanical assembly to the closed position in response to a determination that the external object is disposed within the containment area, the apparatus further comprising a distance sensor configured to output distance data to the controller, wherein the controller is configured to determine that the external object is disposed within the containment area from the distance data.

6. The apparatus of claim 4, wherein the controller is configured to move the mechanical assembly to the open position to release the external object.

7. The apparatus of claim 4, wherein each mechanical assembly further comprises:
    a spring coupled to the first finger link and the second finger link and configured to impart a force on the first finger link, the second finger link, or both to provide tension to the belt.

8. The apparatus of claim 7, wherein the belt is a compliant belt comprising a gripping surface and is configured to flex to provide compliance for holding the external object within the containment area, and wherein the spring and the compliant belt are configured to prevent damage to the external object from the plurality of fingers, and wherein the external object is a fruit or a vegetable.

9. The apparatus of claim 7, wherein the spring is configured to impart the force when the first finger link is disposed relative to the second finger link at an angle smaller than a threshold angle, and wherein the spring is a tension spring.

10. The apparatus of claim 1, further comprising at least three non-linearly disposed bearings coupled to the first finger link, the second finger link, or both and coupled to the belt to allow movement of the belt.

11. The apparatus of claim 4, wherein the actuator is a servo.

12. The apparatus of claim 1, wherein the mechanical assembly further comprises a belt sheath configured to realign a misaligned belt when moving the belt in an extrude direction and the apparatus further comprises an environmental sensor configured to output environmental data to the controller, wherein the controller is further configured to:
    determine, from the environmental data, a presence of the external object within the environment; and
    move the plurality of fingers to a position of the external object.

13. The apparatus of claim 1, wherein the plurality of fingers comprises three fingers.

14. A method comprising:
    positioning a plurality of fingers of a robotic gripper to contact an external object, wherein the fingers are arranged to define a containment area, wherein each finger comprises:
        a mechanical assembly defining a belt path, the mechanical assembly comprising: a first finger link and a second finger link coupled to the first finger link and configured to move relative to the first finger link,
        a belt positioned within the belt path and configured to rotate about both the first finger link and the second finger link during operation, and
        a drive motor configured to operate the belt; and
    operating the drive motors to move the belts in a retract direction to move the external object into the containment area.

15. The method of claim 14, further comprising:
    moving at least one of the first finger link, the second finger link, or both with an actuator to move the mechanical assembly between an open position and a closed position.

16. The method of claim 14, further comprising:
    selectively operating each of the drive motors individually to operate each of the belts individually to selectively orient the object within the containment area.

17. The method of claim 14, further comprising:
    moving the robotic gripper;
    moving the plurality of fingers to an open position; and
    operating the drive motors to move the belts in an extrude direction to withdraw the external object from the containment area.

18. The method of claim 14, further comprising:
    determining a presence of the external object within an environment prior to positioning the plurality of fingers of the robotic gripper to contact the external object.

19. The method of claim 14, wherein each mechanical assembly further comprises:
    a spring coupled to the first finger link and the second finger link and configured to impart a force on the first finger link, the second finger link, or both to provide tension to the belt.

20. The method of claim 19, wherein the belt is a compliant belt configured to flex to provide compliance for holding the external object within the containment area, and wherein the spring and the compliant belt are configured to prevent damage to the external object from the plurality of fingers.

* * * * *